May 31, 1927.
F. A. RUFF
SHOCK ABSORBER
Filed Sept. 11, 1926
1,630,275
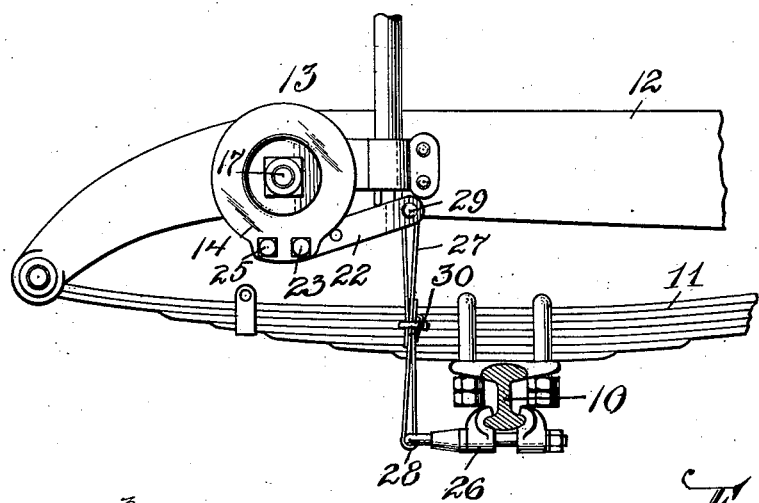
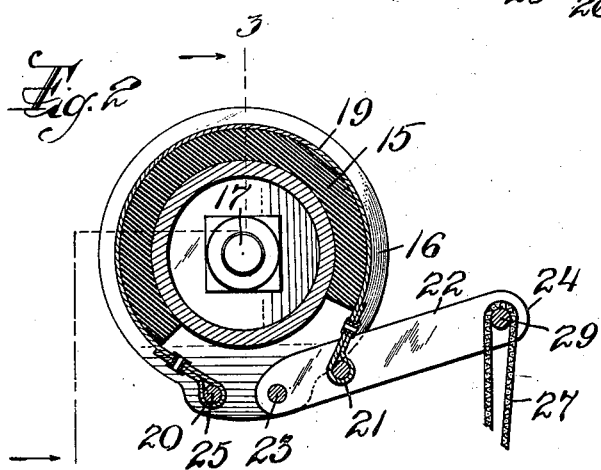
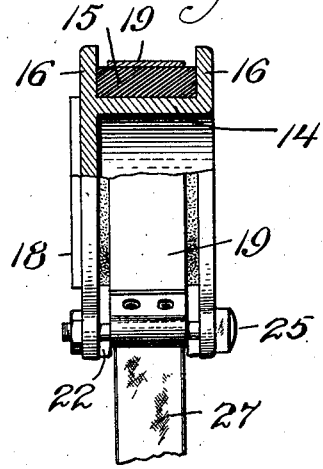
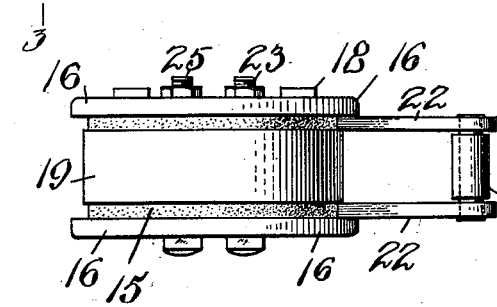
INVENTOR.
Frederick A. Ruff,
BY Wm H Campfield.
ATTORNEY Patented May 31, 1927.

1,630,275

UNITED STATES PATENT OFFICE.

FREDERICK A. RUFF, OF BELLEVILLE, NEW JERSEY.

SHOCK ABSORBER.

Application filed September 11, 1926. Serial No. 134,789.

This invention relates to that class of device known as shock absorbers or snubbers and is designed to provide one that can be easily adjusted and, if necessary, the resilient member replaced with very little loss of time and at small cost.

The invention is particularly designed to provide a compressible member usually of rubber which is compressed by a band that encircles it or nearly encircles it, which band is, in turn, connected to a lever at a point intermediate of its ends, the lever being pivoted at one end and connected by a connection, usually flexible, to the axle or a part associated therewith. The invention also provides, by this arrangement, a direct pull on the lever and, furthermore, provides for the use of a single web or strap which can itself be adjusted as the strap is doubled and is held in adjusted position by a clip.

The invention is illustrated in the accompanying drawings in which Figure 1 is a side view of part of a spring and the chassis of an automobile with my improved shock absorber attached thereto. Figure 2 is a central longitudinal section of the shock absorber. Figure 3 is a section on line 3—3 in Figure 2. Figure 4 is a top view of the shock absorber.

In the drawing in order to show the application of the device I have illustrated the axle 10, the spring 11 and the side bar 12 of the chassis of an automobile. The shock absorber is shown at 13 and comprises a support or casing, a suitable configuration being usually round and it receives on its outer face a resilient block which is arranged around the support. The form I have illustrated consists of a support 14 around which is arranged the block 15 which is illustrated in a channel between the flanges 16. The support is secured to the chassis by suitable means such as the bolt 17 and is kept from turning by suitable means such as the ribs 18 which flank a projection on the chassis.

Arranged around the resilient block 15 is a band 19 usually of steel, fastened at one end as at 20 to the support and fastened at its other end 21 to the lever 22 intermediate of the ends of the lever and preferably near the pivoted end 23 of the lever so as to give more leverage on the free end 24. The bolt 25 and the bolt 23 are preferably used for securing the lever and the fixed end of the band, these bolts also acting to strengthen this part of the support.

To provide an even pull on the band for its entire width the lever is made of two side pieces as may be seen from Figure 4, the distance between these side pieces being approximately the width of the band 19. The free end of the lever 22 is secured to a connection which extends to a fixed part of the vehicle, which latter is illustrated by the clamp 26 and is shown secured to the axle 10. This connection is usually in the form of a canvas strap 27 which is looped around the clamp 26 as at 28 and is looped at the other end around the cross-bar 29 at the free end of the lever. These folds are made with the proper tension and the ends of the strap are fastened against the strap by a suitable clip 30. This provides for an easy and ready adjustment of the tension on the strap when the resilient block becomes slightly compressed but is still usable.

The block 15 is preferably of a size to fit in between the flanges 16 so as to get the full value of the compression of the material. The block or ring 15 is usually made of rubber.

It will be evident that modifications can be made in the arrangement and proportion of the parts without departing from the scope of the invention.

I claim:

1. A shock absorber for springs comprising a casing with an annular channel on the outside, an elastic ring in the channel, a band encircling the ring and secured at one end to the casing, a lever secured at one end to the casing and near said end secured to the other end of the band, and a strand secured to the free end of the lever.

2. A shock absorber comprising a support, a resilient block around the support, a band around the block and secured at one end to the support, a lever pivoted to the support and secured to the other end of the band, the lever having its free end adapted to be secured to a connection.

In testimony whereof I affix my signature.

FREDERICK A. RUFF.